United States Patent [19]
Howes

[11] Patent Number: 5,937,611
[45] Date of Patent: *Aug. 17, 1999

[54] METHOD OF MAKING AN IMPACT RESISTANT WINDOW

[76] Inventor: Stephen E. Howes, 741 SE. Sixth Ter., Pompano, Fla. 33060

[ * ] Notice: This patent is subject to a terminal disclaimer.

[21] Appl. No.: 08/901,093

[22] Filed: Jul. 28, 1997

Related U.S. Application Data

[63] Continuation-in-part of application No. 08/763,487, Dec. 11, 1996, Pat. No. 5,778,629, which is a continuation-in-part of application No. 08/535,537, Sep. 28, 1995, abandoned.

[51] Int. Cl.⁶ .............................. B32B 17/06; E06B 7/00
[52] U.S. Cl. ..................... 52/745.15; 52/786.11; 52/204.53; 52/204.7; 52/800.14; 156/99; 264/251; 264/254
[58] Field of Search .................. 156/99, 106, 109; 52/202, 171.1, 204.5, 204.53, 204.591, 204.593, 204.597, 204.6, 204.62, 204.69, 204.7, 786.1, 786.11, 786.12, 762, 764, 770, 773, 778, 800.14, 717.01, 718.04, 772, 780, 745.15; 264/251, 254, 263

[56] References Cited

U.S. PATENT DOCUMENTS

| | | |
|---|---|---|
| 309,636 | 12/1884 | Mann . |
| 1,153,350 | 9/1915 | Smith . |
| 2,121,777 | 6/1938 | Bailey et al. . |
| 2,177,001 | 10/1939 | Owen . |
| 2,193,207 | 3/1940 | Rosen . |
| 2,300,506 | 11/1942 | Kamerer . |
| 2,351,991 | 6/1944 | McClain . |
| 2,356,878 | 8/1944 | Painter . |
| 2,369,382 | 2/1945 | Watkins . |
| 2,374,057 | 4/1945 | Watkins ................................. 52/99 X |
| 2,401,552 | 6/1946 | Cox ...................................... 156/106 X |
| 2,406,939 | 9/1946 | Boicey . |
| 2,408,483 | 10/1946 | Rodman . |
| 2,409,808 | 10/1946 | Sowle . |
| 2,497,957 | 2/1950 | Pelley . |
| 2,567,353 | 9/1951 | Ryan ................................. 52/786.12 X |
| 2,572,947 | 10/1951 | Pevney . |

(List continued on next page.)

FOREIGN PATENT DOCUMENTS

| | | |
|---|---|---|
| 15728 | 9/1928 | Australia . |
| 0325098 | 7/1989 | European Pat. Off. . |
| 2495130 | 12/1980 | France . |
| 3203264 | 2/1982 | Germany . |
| 3708966 | 3/1987 | Germany . |
| 1562792 | 3/1980 | United Kingdom . |
| 2121858 | 1/1984 | United Kingdom . |
| 2155856 | 10/1985 | United Kingdom ..................... 156/99 |

OTHER PUBLICATIONS

Sax, N. Irving and Lewis, Sr., Richard J.., "Hawley's Condensed Chemical Dictionary, Eleventh Edition", Van Nostrand Reinhold Co., pp. 19, 934, 936, 945 and 1039–1040 (1987).

*Primary Examiner*—Carl D. Friedman
*Assistant Examiner*—Laura A. Callo
*Attorney, Agent, or Firm*—Wood, Herron & Evans, L.L.P.

[57] ABSTRACT

An impact resistant window including a frame holding a glass composite structure including first and second glass sheets secured to each other with a middle plastic layer. In a first embodiment, the first glass sheet has a larger perimetrical dimension than the second glass sheet and the second glass sheet is centered on the first sheet to define a peripheral mounting portion. A resilient sealant material fills a space between the peripheral mounting portion of the first glass sheet and the frame structure. In the second embodiment, the two glass sheets may be the same size, but the middle plastic layer extends outwardly from the perimeters of the glass sheets. This extension of the middle plastic layer is used to mechanically connect the laminated pane to a frame. A method is provided for making an impact resistant window of the second embodiment which may also be used to form a window of the first embodiment.

20 Claims, 4 Drawing Sheets

U.S. PATENT DOCUMENTS

| | | | |
|---|---|---|---|
| 2,679,467 | 5/1954 | Sherts | 156/106 X |
| 2,755,518 | 7/1956 | Stroud . | |
| 2,808,355 | 10/1957 | Christie et al. . | |
| 2,837,454 | 6/1958 | Watkins et al. | 156/99 X |
| 2,945,269 | 7/1960 | Domen . | |
| 3,248,273 | 4/1966 | Boicey . | |
| 3,343,317 | 9/1967 | Cripe . | |
| 3,375,626 | 4/1968 | Grotefeld et al. . | |
| 3,825,917 | 7/1974 | Lucky . | |
| 3,825,918 | 7/1974 | Laidlaw, Jr. et al. . | |
| 3,825,919 | 7/1974 | Levin et al. . | |
| 3,825,920 | 7/1974 | Nelson et al. . | |
| 3,930,452 | 1/1976 | Van Laethem et al. . | |
| 4,004,388 | 1/1977 | Stefanik . | |
| 4,073,986 | 2/1978 | Keslar et al. . | |
| 4,151,696 | 5/1979 | Knights et al. . | |
| 4,204,374 | 5/1980 | Olson . | |
| 4,228,425 | 10/1980 | Cooke . | |
| 4,324,373 | 4/1982 | Zibritosky . | |
| 4,546,986 | 10/1985 | Roselli . | |
| 4,551,372 | 11/1985 | Kunert . | |
| 4,625,070 | 11/1986 | Berman et al. . | |
| 4,724,023 | 2/1988 | Marriot | 156/99 X |
| 4,774,143 | 9/1988 | Gondela et al. . | |
| 4,817,347 | 4/1989 | Hand et al. . | |
| 4,873,803 | 10/1989 | Rundo . | |
| 4,908,083 | 3/1990 | Hall . | |
| 4,952,258 | 8/1990 | Grolig et al. | 165/99 |
| 4,978,405 | 12/1990 | Hickman | 156/99 X |
| 5,002,820 | 3/1991 | Bolton et al. . | |
| 5,019,443 | 5/1991 | Hall . | |
| 5,268,049 | 12/1993 | Marriott et al. | 156/99 |
| 5,315,952 | 5/1994 | Jackson, Jr. . | |
| 5,426,897 | 6/1995 | Gazaway . | |
| 5,462,805 | 10/1995 | Sakamoto et al. . | |
| 5,553,422 | 9/1996 | Gazaway . | |
| 5,636,484 | 6/1997 | DeBlock | 52/204.5 |
| 5,765,325 | 6/1998 | DeBlock | 52/204.5 |

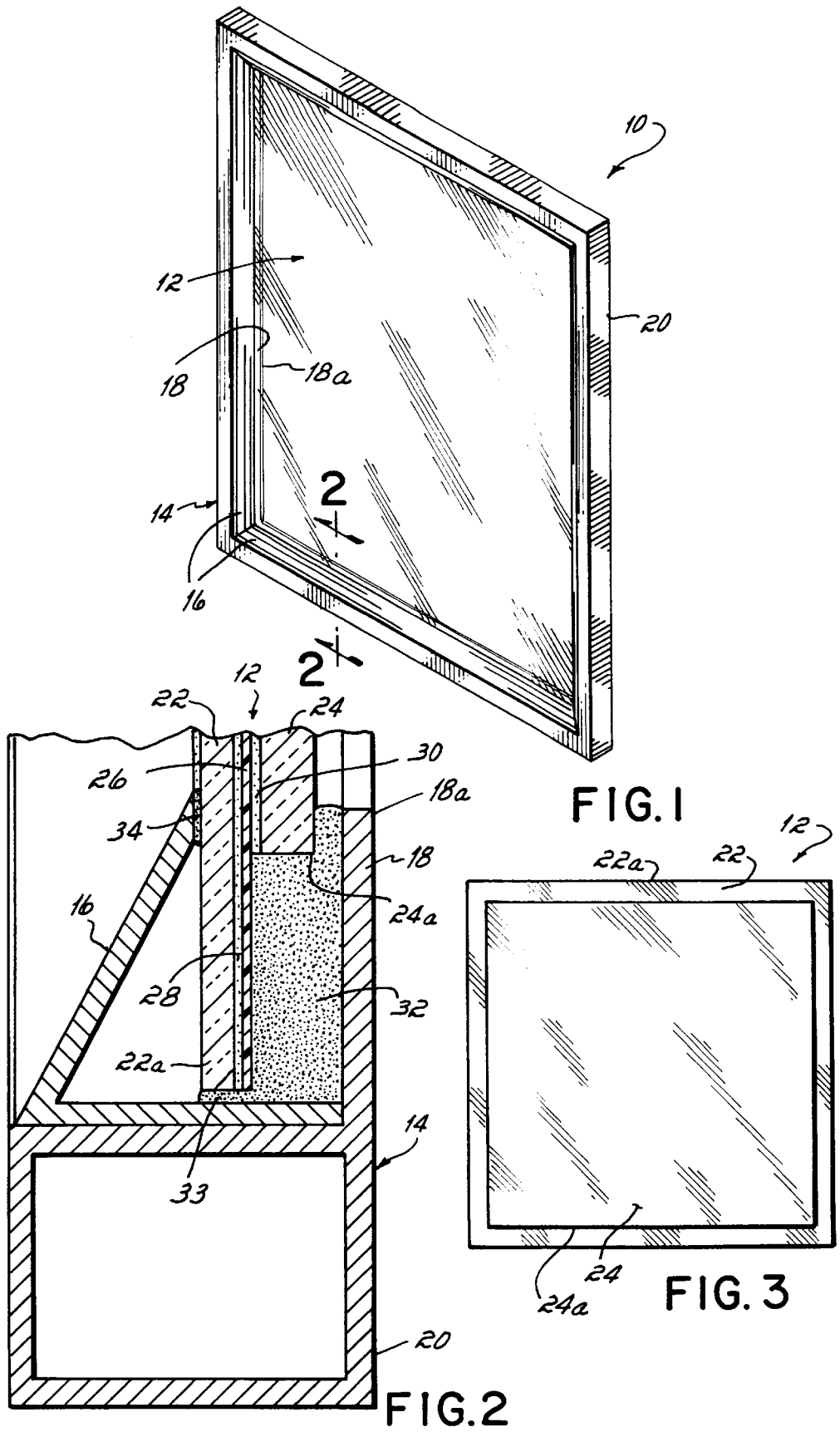

METHOD OF MAKING AN IMPACT RESISTANT WINDOW

RELATED APPLICATIONS

This application is a continuation-in-part application of U.S. application Ser. No. 08/763,487 filed Dec. 11, 1996, now U.S. Pat. No. 5,778,629 which is a continuation-in-part of U.S. application Ser. No. 08/535,537 filed Sep. 28, 1995, now abandoned.

BACKGROUND OF THE INVENTION

The present invention generally relates to windows and, more specifically, to a method of making an impact resistant window structure especially suited for use in houses or buildings located in geographic regions susceptible to strong weather conditions such as tropical storms and hurricanes.

Impact resistant windows are desirable in many locations and situations. One application is in buildings or houses located in geographic regions which are highly susceptible to strong adverse weather conditions, such as hurricanes, involving extremely high winds. In such conditions, high winds can hurl large projectiles or debris into windows and the high winds themselves can create large pressure differentials between the inside and outside of a building. These pressure differentials can easily blow out or otherwise damage the windows of the house or building and cause injury to occupants.

Several local building codes in hurricane zones now require new windows to conform to strict standards related to the ability of the window to withstand large impacts and large pressure differentials. One standard requires windows to withstand two strikes by an 8 foot long "two by four" piece of wood traveling at 34 mph. Then, after these two strikes, the window is subjected to 4,500 positive and 4,500 negative pressure cycles at about 75 psf that simulates the eye of a hurricane passing the building. It appears that adoption of such strict standards will be universal in regions such as the southeastern portion of the United States.

One product which has successfully passed hurricane tests such as the one described above is marketed under the name "SENTRYGLAS". SENTRYGLAS is a laminated glass product which may be contained in a conventional window frame structure and includes an outer glass sheet, an outer polyester film layer and a polyvinyl butyryl layer sandwiched therebetween to adhere the polyester layer to the glass sheet. Silicone is used to secure this laminated glass product within the frame structure in a conventional manner. Although this product has passed hurricane tests, it has disadvantages associated with its relatively high cost combined with the fact that the polyester film layer scratches very easily and may not be replaced without replacing the entire glass laminate product.

One attempted solution to this problem involved laminating an additional glass layer on the opposite side of the polyester film layer to make the composite more similar to conventional laminated glass. This additional glass layer was of the same length and width dimensions as the first glass layer. However, when this modified SENTRYGLAS composite is subjected to the hurricane tests such as those mentioned above, the additional glass layer breaks and cuts or slices through the silicone sealant used to hold the composite in the frame. The glass then vacates the window and frame structure and the window therefore fails the test. This is especially true with standard lightweight vinyl or wood windows used in most residences.

In view of the problems associated with available impact resistant window structures, there is a need for an impact resistant window which can not only pass the strict hurricane test standards now being imposed but which is also more aesthetically pleasing and economical than past impact resistant windows.

SUMMARY OF THE INVENTION

In accordance with the preferred embodiment of the present invention, a window structure is provided utilizing a glass laminate structure which closely resembles an all glass window and is scratch resistant as well as highly impact resistant. Generally, the window of the present invention includes two outer laminates or sheets which sandwich one or more laminates or sheets therebetween. Each of the sheets is at least translucent and preferably transparent. In accordance with a first embodiment of the present invention, one of the outer sheets is reduced in its perimetrical dimension with respect to the other of the outer sheets. In the case of a simple four sided window pane shown as the preferred embodiment, the length and width dimensions of one outer sheet is smaller than the length and width dimensions of the other of the outer sheets.

The larger sized sheet sits a greater distance within the frame of the window while the smaller of the two outer sheets preferably only fits partially within the inside edge of the frame. Preferably, the entire perimeter of the laminated window pane is bounded by a portion which remains unlaminated by the second, outer sheet. This peripheral unlaminated portion of the window pane is set within a conventional window frame structure and the space formed between the first, larger sheet and the inside of the window frame is filled with a sealant or caulking such as silicone. The middle sheet is preferably a flexible plastic film layer covering the entire larger sheet and forming an adhesive bond to the silicone.

In the second embodiment, an impact resistant window is provided comprising a frame structure, a composite sheet structure including first and second rigid translucent sheet and a flexible translucent film layer adhered between the first and second rigid translucent sheets. In accordance with this second embodiment, an edge portion of the flexible translucent film layer extends outwardly from both the first and second rigid translucent sheets and is mechanically affixed to the frame structure. When impact and pressure tested to simulate hurricane conditions, the mechanical fixation of the flexible film layer to the frame structure has proven to prevent the composite sheet structure from vacating the frame structure. As in the first embodiment, the first and second rigid translucent sheets are preferably glass sheets. The flexible translucent film layer is preferably adhered to the respective first and second rigid translucent sheets by first and second layers of adhesive, which may be the same adhesive used in the first embodiment. The film layer is preferably a polyester film which inherently has very little stretch capability.

Although the mechanical fixation of the flexible translucent film layer to the frame structure may be made in various ways, a preferred manner is to affix the edge portion of the film layer between two frame components. These two components may be adhesively secured to one another, secured by mechanical fasteners such as screws, or secured together in any other conventional manner. In the preferred embodiment, the edge portion of the flexible translucent film layer extends transversely to the composite sheet structure toward one side of the frame structure. This side of the frame structure may be the outside of the window and typically has a greater cross-sectional dimension than the inside portion of the frame structure. This greater cross-sectional dimension further strengthens the connection between the composite sheet structure and the frame structure. A resilient sealing material preferably fills spaces between the respective first and second rigid translucent sheets and the frame structure. In a further aspect of the second embodiment, the edge portion of the film layer preferably extends around an entire periphery or perimeter of the first and second rigid translucent sheets.

In a further aspect of the invention, an impact resistant window pane is provided generally comprising a composite sheet structure including first and second rigid translucent sheets each having a perimeter and a flexible translucent film adhered between the first and second rigid translucent sheets. The flexible translucent film extends outwardly from the perimeter of both the first and second rigid translucent sheets. The first and second rigid translucent sheets are preferably glass sheets and the flexible translucent film layer again preferably comprises a polyester film. The edge portion of the film preferably extends outwardly from the first and second sheets around the entire perimeters of the sheets.

In both embodiments, the two outside laminates are glass sheets while the third, inner laminate is a strengthening plastic layer, such as a polyester film. The polyester film may be adhered to both glass sheets by a compatible adhesive, such as a polyester resin.

With the composite glass laminate structure of the present invention, a glass composite product is formed having both inner and outer glass layers which therefore give the window a very realistic glass appearance. Also, as both the inside and outside surfaces of the window are glass surfaces, they are not easily scratched or otherwise marred during normal use. Finally, in accordance with a main advantage of this invention, the glass composite laminate structure of the invention passes the hurricane standard tests explained above. In the first embodiment, as the smaller outside glass sheet does not extend fully into the frame structure along with the larger glass sheet, this smaller glass laminate layer does not break away from the larger layer and break through the frame as is the case with prior attempts in this area. In the second embodiment, while the two glass sheets may be of the same dimension, the film layer extending outwardly from each glass sheet retains even broken glass within the frame through mechanical fixation.

In yet a further aspect of this invention, a method of making an impact resistant window is provided which generally includes the steps of laminating first and second translucent sheets together with a flexible translucent film layer disposed therebetween and having an edge portion thereof extending outwardly from respective edge portions of the first and second translucent sheets; mechanically securing the edge portion of the film layer between component parts of a frame structure; and securing the first and second translucent sheets within the frame structure using a resilient sealing material. More specifically, the method involves placing on a support surface a template sheet of a size generally equal to a sheet of glass to be used to make the window; securing a flexible translucent film layer over the template sheet with an edge portion of the film layer extending beyond an outer edge of the template sheet; applying two sided adhesive tape on the film layer and generally parallel to the outer edges of the template sheet; securing the first translucent sheet to the two sided adhesive tape to leave a first adhesive receiving space between the first translucent sheet and the film layer; filling the first adhesive receiving space with adhesive; turning the film layer and first translucent sheet over after the adhesive has secured; using the first translucent sheet as the template sheet, applying additional double sided adhesive tape to an opposite side of the film layer generally parallel to the outer edges of the first translucent sheet; securing a second translucent sheet to the additional double sided adhesive tape to form a second adhesive receiving space between the film layer and the second translucent sheet; filling the second adhesive receiving space with adhesive; allowing the adhesive in the second adhesive receiving space to cure; and securing the laminated first and second translucent sheets and film layer within a frame structure by fixing the first and second translucent sheets between components of the frame structure and mechanically affixing the edge portion of the film layer to the frame structure.

Preferably, in this more specifically described method, the second translucent sheet is used as the template sheet in the initial step. The edge portion of the film layer is preferably affixed between two components of the frame structure. The film layer is also preferably oriented transversely to the first and second translucent sheets toward a side of the frame structure which has a greater cross-sectional dimension than another side of the frame structure. As described above, resilient sealing material is preferably used between the first and second translucent sheets and the frame structure to finalize the construction of the window.

Additional advantages and objects of the present invention will become readily apparent to those of ordinary skill upon review of the following detailed description of the preferred embodiment taken in conjunction with the accompanying drawings.

BRIEF DESCRIPTION OF THE DRAWINGS

FIG. 1 is a perspective view of a window constructed in accordance with the preferred embodiment of this invention;

FIG. 2 is a cross-sectional view of the window frame structure and glass laminate structure in the area surrounding the frame and taken along line 2—2 of FIG. 1;

FIG. 3 is a plan view of the glass laminate structure of the first embodiment of the invention without the frame;

DETAILED DESCRIPTION OF THE PREFERRED EMBODIMENTS

Figure 4:
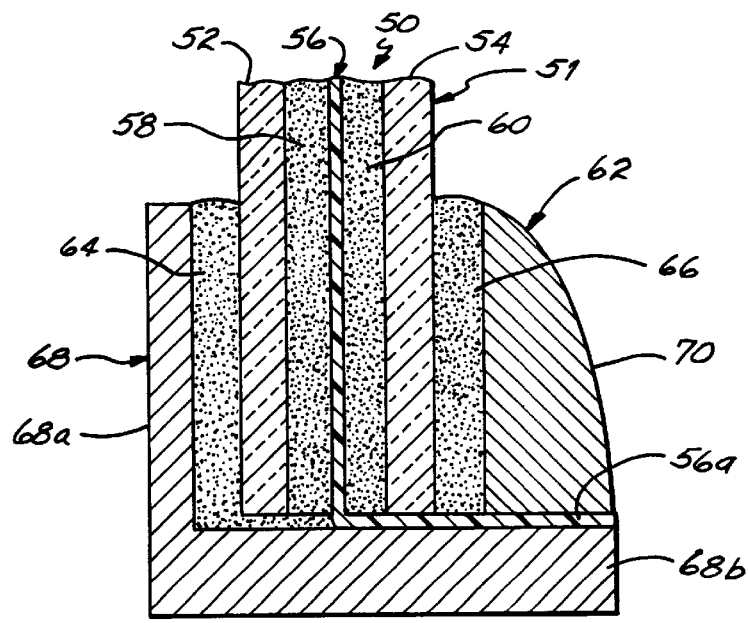
FIG. 4 is a cross-sectional view similar to FIG. 2 but showing an alternative glass laminate or composite structure and mechanical fixation to the window frame structure.

FIG. 1 illustrates a simple form of window 10 constructed in accordance with the present invention. In its most basic form, window 10 comprises a glass laminate structure or composite 12 fixed within a peripheral frame structure 14.

Of course, window 10 may take on many other forms and shapes depending on the needs of the application or the aesthetics desired, however, the principles of the present invention will remain essentially the same.

FIG. 2 illustrates a cross-sectional view of the frame 14 and the peripheral portion of glass composite 12 which has been secured into frame 14. Specifically, glass composite 12 has been fixed between an outside support 16 and an inside support 18 of frame 14. Supports 16, 18 extend inwardly from an outer peripheral frame portion 20 which may be fixed into a building structure in a conventional manner. Frame 14 may be a conventional frame and has been schematically shown as such in the drawings.

Glass laminate structure or composite 12 more specifically includes a first glass layer or laminate 22 and a second glass layer or laminate 24 sandwiching a plastic strengthening layer or third laminate 26 therebetween. Glass layer 22 is the outside glass layer and is of a larger overall length and width dimension than inside glass layer 24 as shown in FIG. 3. As also shown in FIG. 3, glass layer 24 is substantially centered on glass layer 22 to provide mounting portion 22a around the entire perimeter of laminate structure 12. Glass layer 22 is preferably about 1–2" larger in both length and width than inside glass layer 24. Therefore, if glass layer 22 is 24"×24", glass layer 24 may be 22"×22" in size. The entire peripheral region 22a of glass layer 22 therefore preferably remains "unlaminated" by glass layer 24.

Plastic layer 26 is preferably a polyester film or "PET" layer which is adhesively secured to opposed surfaces of glass layers 22, 24 by respective adhesive layers 28, 30. Adhesive layers 28, 30 are preferably formed of a polyester resin which is compatible with both glass and PET. Alternatively, polyvinyl butyryl may be used as the adhesive for layers 28 and 30. As shown in FIG. 2, plastic layer 26 and adhesive layer 28 preferably extend to the peripheral edge of glass layer 22. Caulking or sealant 32 such as conventional silicone caulking fills the space between peripheral portion 22a of glass layer 22 and frame support member 18. The peripheral edge of glass layer 22 also preferably seats against silicone sealant or caulking 33 as shown in FIG. 2. Sealant or caulking 34 is also applied between frame support 16 and outside glass layer 22.

As will also be appreciated from FIG. 2, inside glass layer 24 is not reduced in size so much as to expose its peripheral edge 24a outside of edge 18a of support 18. In other words, inside glass layer 24 is sized large enough to extend just into frame 14 to be hidden from view when window 10 is fully constructed as shown in FIG. 1. Therefore, window 10 looks exactly like a conventional window as the unique structure of the present invention is hidden from view within frame 14.

During the hurricane tests explained above, in which an 8 foot long two by four is used to strike window 10 twice at 34 mph and then in which window 10 is subjected to 4,500 positive and 4,500 negative pressure cycles at about 75 psf (simulating hurricane conditions), glass composite or laminate structure 12 does not break out of frame 14. This is believed to be due to the design of the peripheral portions of glass laminate structure or composite 12. Specifically, peripheral glass layer portion 22a moves against silicone caulking 32 but does not move against another glass laminate layer within this space which could break off and slice through caulking 32 and vacate frame 14. In addition, this embodiment fulfills the objectives of constructing a window which is pleasing in appearance as the areas which are seen between the four portions of frame 14 are all glass on both the inside and outside of the house or building. Finally, the glass composite or laminate product 12 is also scratch resistant because of the use of inside and outside glass layers.

FIG. 4 illustrates the second embodiment of this invention in the form of a cross-sectional view of a window 50, similar to the cross-sectional view shown in FIG. 2 of the first embodiment. Specifically, window 50 includes a composite sheet structure 51 comprising a first rigid translucent sheet 52, a second rigid translucent sheet 54 and an intermediate flexible translucent film layer 56. Preferably, this film layer 56 is adhered between the two sheets 52, 54 by respective adhesive layers 58, 60, the thickness of which has been exaggerated for clarity. Adhesive layers 58, 60 are preferably formed of polyester resin as in the first embodiment. Film layer 56 is preferably a polyester film of a conventional variety as in the first embodiment. One film may be obtained from IC Films, Inc., Wilmington, Del. under the trade name Melinex.

Window pane 51 is secured within a frame structure 62, in part by respective layers of resilient sealing material 64, 66 contained in spaces between window pane 51 and frame structure 62. As in the first embodiment, this resilient sealing material 64, 66 may be conventional silicone caulking. Frame structure 62 may be constructed of a conventional lightweight metal such as aluminum, or may be constructed of vinyl or wood especially if used in typical residential application. Frame structure 62 includes separate frame components 68, 70. Frame component 68 is L-shaped in cross section and includes two legs 68a, 68b.

In accordance with a main aspect of the second embodiment, an edge portion 56a of the flexible translucent film layer 56 extends between the two frame components 68, 70. Edge portion 56a extends outwardly from the perimeters of both sheets 52, 54. The perimeters of sheets 52, 54 are preferably about equal in dimension and the edge portion 56a extends around the entire perimeter. Edge portion 56a is mechanically secured between frame components 68, 70, for example, by being adhesively secured to each component 68, 70. Other conventional manners of mechanically fixing edge portion 56a to frame structure 62 may equally be used and include screws or other mechanical fasteners. These fasteners may be directed through leg 68b of frame component 68 and into frame component 70 to secure these two components together.

In a preferred manner of carrying out the second embodiment, edge portion 56a extends transversely to window pane 51 along leg 68b of frame component 68. Moreover, edge portion 56a is secured within a stronger, thicker side of frame structure 62, comprising leg 68b and frame component 70, such that during any impact or any significant pressure differential, the impact or force is directed through window pane 51, intermediate layer 56 and edge portion 56a to the strongest portion of frame structure 62. This greatly assists in maintaining the integrity of window 50 during any harsh conditions such as hurricanes. Although this is the preferred manner of securing edge portion 56a, edge portion 56a may be mechanically fastened within any conventional frame structure in any suitable manner while still obtaining benefits of the invention, most notably preventing glass shards or pieces from vacating the window.

During the hurricane tests explained above, in which an eight foot long 2×4 is used to strike window pane 51 twice at 34 mph and in which window 50 is subjected to 4,500 positive and 4,500 negative pressure cycles at about 75 psf (simulating hurricane conditions), the window pane or glass composite structure 51 does not vacate frame structure 62. This is believed to be due to the design of the peripheral portions of composite structure 51 in combination with the mechanical fixation of peripheral film edge portion 56a within frame structure 62. Specifically, film layer 56 holds the entire composite sheet structure 51 together, even if one or both sheets 52, 54 break, and edge portion 56a holds the entire composite sheet structure 51 to window frame structure 62 during the impact and pressure differential conditions.

In addition, the second embodiment of the invention also fulfills the objectives of constructing a window which is pleasing in appearance and scratch resistant. Moreover, like the first embodiment, this second embodiment is also more easily and more inexpensively manufactured than impact resistant windows and window panes of the past.

Many modifications may be made to the specific details provided herein with respect to windows 10 and 50 including, but not limited to, many alternative shapes for windows 10 and 50 and alternative designs for frames 14 and 62. Various inner plastic strengthening layers may be used in the laminate product or composite of the present invention. In the first embodiment, these plastic layers may or may not extend to the periphery of glass layer 22. In the second embodiment, the film layer may or may not extend transversely to the window pane, although certain advantages such as design compactness and strength are associated with the transverse orientation. For both embodiments, although various thicknesses may be used for the glass sheets and inner plastic film depending on the application, one preferred composite structure uses ⅛" thick glass sheets and polyester film or PET about 3–10 mil thick.

A method of making window 50 is shown in FIGS. 5–10. This method utilizes a generally conventional procedure to produce the unique structure shown in FIG. 4. It will be appreciated by those of ordinary skill that this method may be also used with slight modification to produce laminated structure 12 shown in FIGS. 1–3.

Figure 5:
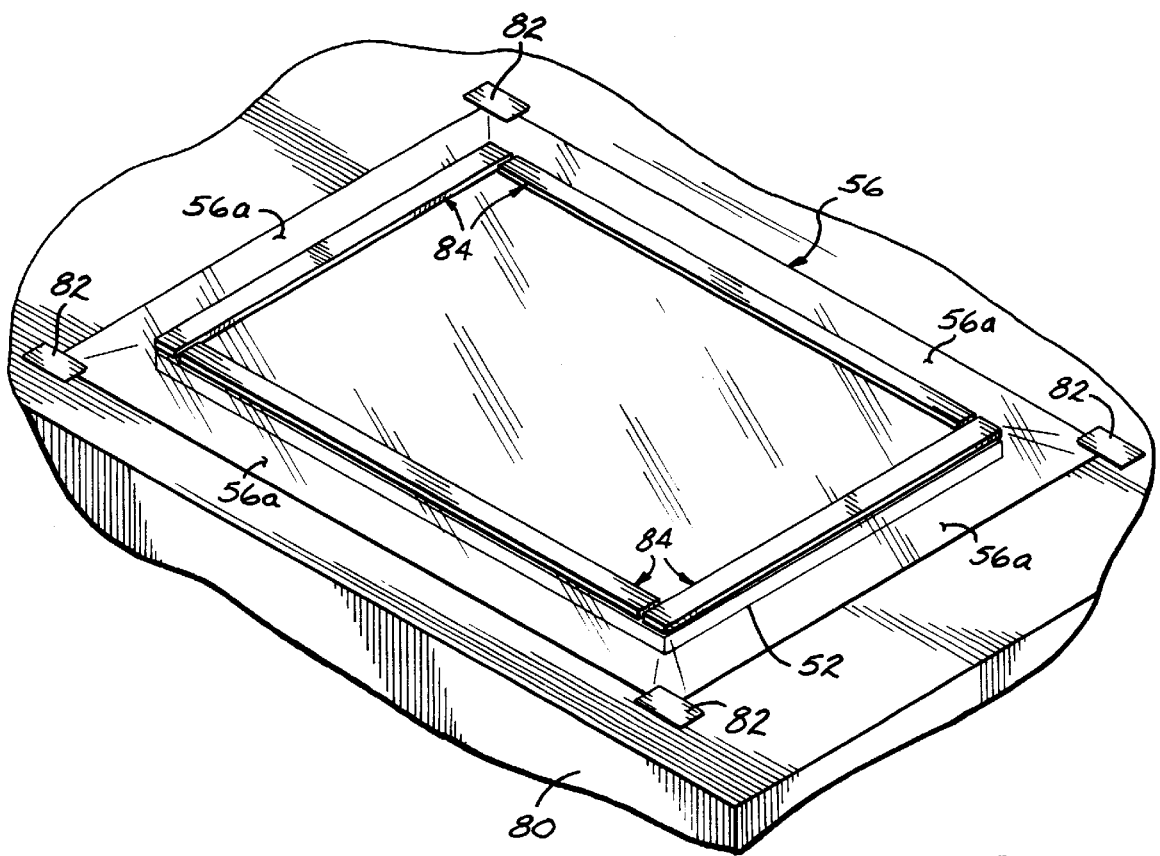
FIG. 5 is a perspective view showing the initial steps of the method of making a window in accordance with the second embodiment of this invention.
Figure 6:
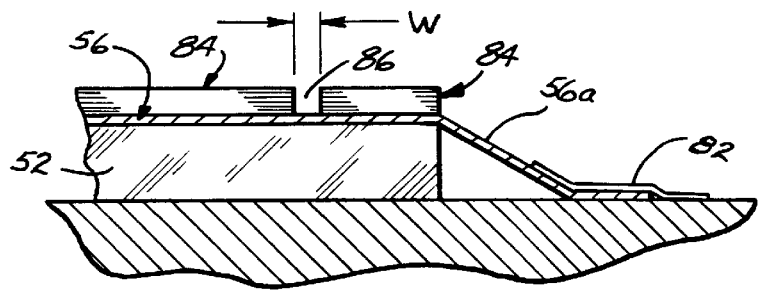
FIG. 6 is an enlarged cross-sectional view of one corner of the assembly shown in FIG. 5.
Figure 7:
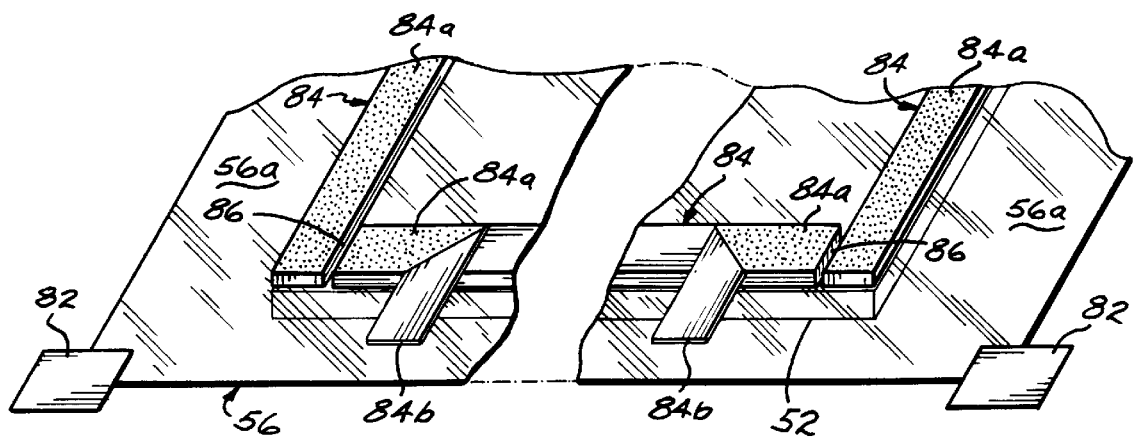
FIG. 7 is a partial perspective view showing a subsequent step in the method.

Referring first to FIG. 5, a sheet which is preferably glass sheet 52 but which may be any similarly sized template sheet is first laid on a table 80 and film layer 56 is stretched out over glass sheet 52 leaving approximately 1½" of film layer 56 extending outwardly from all edges of glass sheet 52. In this stretched out state, film layer 56 is taped to table 80 at the corners using masking tape 82. Double sided adhesive tape 84 is adhesively secured along the outer edges of glass sheet 52, on top of film layer 56, using the edges of glass sheet 52 as a sight line. At this stage, the upper release paper of double sided tape 84 is left in place. As shown best in FIG. 6, double sided adhesive tape 84 is laid on top of film layer 56 leaving gaps 86 generally at the corners thereof having a width "w" of approximately 1/32 inch. Then, the release paper of the two faced adhesive tape 84 is removed on three sides leaving one side intact. Preferably, a longer edge of the window is left with double sided adhesive tape still having the release paper on top. As shown in FIG. 7, this release paper layer should have the two corners 84b of the release paper turned back approximately one inch and creased at an angle to protrude from the edge of the glass so that it may be easily removed later in the process as will be described below.

Figure 8:
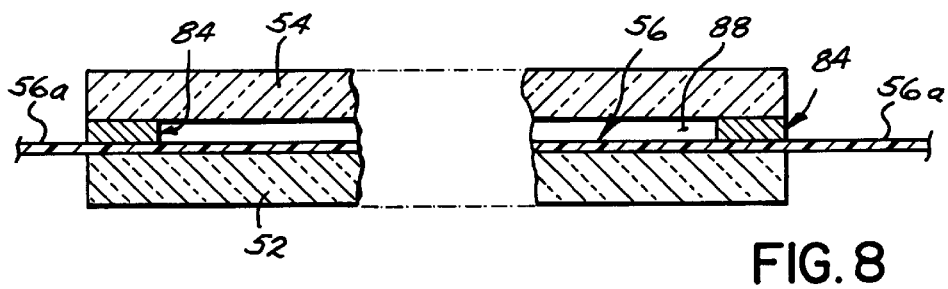
FIG. 8 is a cross-sectional view showing a subsequent step of creating an adhesive receiving space between a glass sheet and film layer of the construction.

As shown in FIG. 8, the next step in the process is to place the second sheet glass 54 on top of the double sided adhesive tape 84 aligning the respective edges of glass sheets 52, 54 as shown. Thus, glass sheet 54 will adhere to the adhesive 84a on the three sides of tape 84 in which the release paper has been removed.

Figure 9:
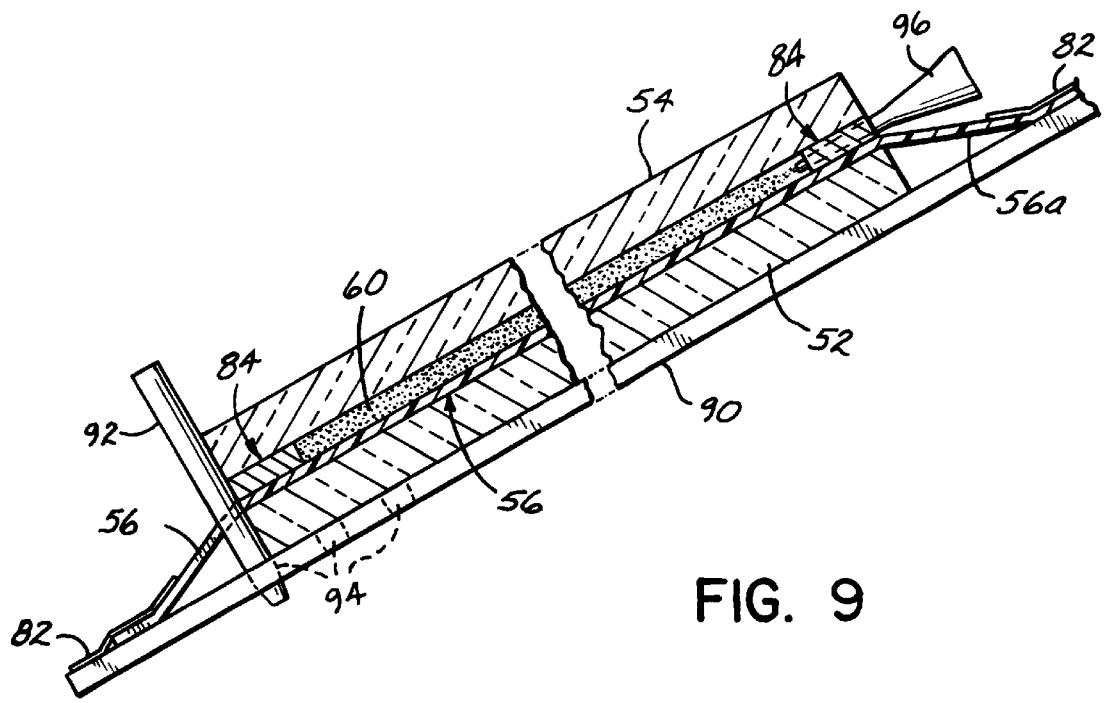
FIG. 9 is a cross-sectional view showing a subsequent step of filling the adhesive receiving space with adhesive.
Figure 10:
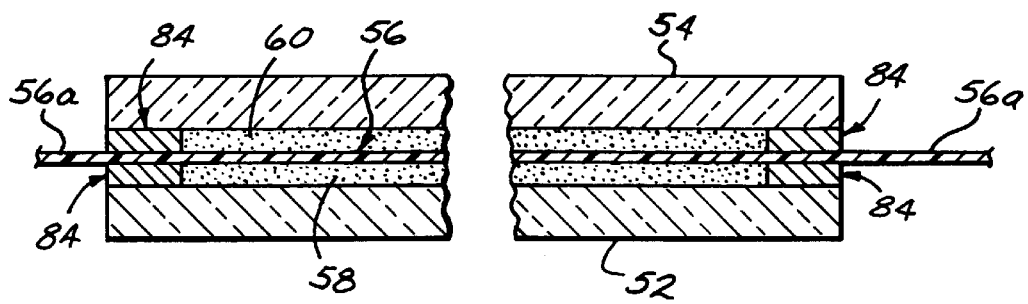
FIG. 10 is a cross-sectional view of the completed laminated structure.

This creates a resin or laminating adhesive receiving space 88 between glass sheet 54 and film layer 56. The assembly is then placed on a tilt table 90 as shown in FIG. 9 and held in place by a plurality of pegs or stop members 92 which may be received in any one of several holes 94 in tilt table 90. Providing several holes 94 allows for adjustability of the location of the assembly depending on its size. A funnel 96 is then placed between glass sheet 54 and double sided adhesive tape 84 which still has the release paper thereon. Receiving space 88 is then filled with polyester resin 60 or another adhesive such as polyvinyl butyryl. A measured volume of resin is poured or pumped between glass sheet 54 and film layer 56. When the correct volume of adhesive has been poured or pumped, the last side of the release paper is removed and the unit is adhered together on all four sides. The composite assembly is then laid in a flat position by lowering the tilt table 90. Any trapped air will escape from between glass sheet 54 and film layer 56 by way of gaps 86 which were left at the corners of the assembly between pieces of the double sided adhesive tape 84. Once the resin has cured, the unit is turned over, and the bottom piece of glass 52 now becomes the top piece of glass. This piece is removed and put aside. The two faced adhesive tape is again applied on all four sides of the plastic film layer 56 as shown and described with respect to FIG. 5 and the process is repeated. Once repeated, a glass composite structure as shown in FIG. 10 will be formed and this may be assembled into a frame structure as shown in FIG. 4.

It will be appreciated that the above described method may also be used, with some basic modifications, to produce the laminate 12 of the first embodiment. In this regard, the double sided adhesive tape may be secured to the first piece of glass approximately 1½" from each edge, i.e., in alignment with the edges of a smaller sheet of glass that will be laid upon the tape as described above. This will provide for the formation of the unlaminated mounting portion 22a. In this latter regard, the film layer of mounting portion 22a may be separately secured to the glass sheets by appropriate application of adhesive on both sides thereof.

Applicant does not intend to be bound by the specific details provided herein but intends only to be bound by the scope of the appended claims.

What is claimed is:

1. A method of making an impact resistant window comprising the steps of:

a) laminating first and second translucent sheets together using respective adhesive layers contacting a flexible translucent film layer disposed therebetween and having an edge portion of said flexible translucent film layer extending outwardly from respective edge portions of the first and second translucent sheets;

b) mechanically securing the edge portion of the film layer between component parts of a frame structure; and c) securing the first and second translucent sheets within the frame structure using a resilient sealing material.

2. The impact resistant window of claim 1 wherein said first and second translucent sheets are glass sheets.

3. The method of claim 1 wherein the film layer is a polyester film.

4. The method of claim 1 wherein step (b) further includes orienting the edge portion of the film layer transversely to the first and second translucent sheets and toward a first side of the frame structure.

5. The method of claim 4 wherein said first side of the frame structure is of greater cross-sectional dimension than an opposite, second side of the frame structure and step (b) further includes securing the edge portion of the film layer to the first side of said frame structure.

6. The method of claim 1 wherein the edge portion extends around an entire periphery of said first and second translucent sheets.

7. The method of claim 1, wherein the edge portion of the film layer is mechanically clamped between opposing surfaces of the component parts.

8. A method of making an impact resistant window comprising the steps of:
   a) placing a template sheet on a support surface;
   b) securing a flexible translucent film layer over the template sheet with an edge portion of the film layer extending beyond an outer edge of the template sheet;
   c) applying two sided adhesive tape on the film layer and generally parallel to the outer edges of the template sheet;
   d) securing a first translucent sheet to the two sided adhesive tape to leave a first adhesive receiving space between the first translucent sheet and the film layer;
   e) filling the first adhesive receiving space with adhesive;
   f) turning the film layer and first translucent sheet over after the adhesive has cured;
   g) using the first translucent sheet as the template sheet, applying additional double sided adhesive tape to an opposite side of the film layer generally parallel to outer edges of the first translucent sheet;
   h) securing a second translucent sheet to the additional double sided adhesive tape to form a second adhesive receiving space between the film layer and the second translucent sheet;
   i) filling the second adhesive receiving space with adhesive;
   j) allowing the adhesive in the second adhesive receiving space to cure; and
   k) securing the laminated first and second translucent sheets and film layer within a frame structure by:
      i) fixing the first and second translucent sheets between components of the frame structure, and
      ii) mechanically affixing the edge portion of said film layer to said frame structure.

9. The method of claim 8 wherein the second translucent sheet is used as the template sheet in step (a).

10. The method of claim 8 wherein said first and second translucent sheets are glass sheets.

11. The method of claim 8 wherein the film layer is a polyester film.

12. The method of claim 8 wherein step (k) further includes securing the edge portion of said film layer between two components of said frame structure.

13. The method of claim 12 wherein step (k) further includes orienting the edge portion of the film layer transversely to the first and second translucent sheets and toward a first side of the frame structure.

14. The method of claim 13 wherein said first side of the frame structure is of greater cross-sectional dimension than opposite, second side of the frame structure and step (k) further includes securing the edge portion of the film layer to the first side of said frame structure.

15. The method of claim 8 further including the step of placing resilient sealing material between the respective first and second translucent sheets and the frame structure.

16. The method of claim 8 wherein the edge portion extends around an entire periphery of said first and second translucent sheets.

17. A method of making an impact resistant window comprising:
   a) adhesively securing two glass sheets together with an intermediate flexible, translucent film layer secured between respective adhesive layers and with peripheral edge portions of said flexible, translucent film layer extending from peripheral edge portions of the glass sheets;
   b) orienting a section of the peripheral edge portions of said flexible, translucent film layer such that the section is disposed in a transverse position relative to said glass sheets; and,
   c) securing the section of said flexible, translucent film layer within a window frame structure.

18. The method of claim 17 wherein the securing step further comprising:
   mechanically securing the section of said film layer between component parts of the frame structure.

19. The method of claim 18, wherein the section is clamped between opposing surfaces of said component parts.

20. The method of claim 17 further comprising:
   securing the glass sheets within the frame structure using a resilient sealing material, wherein the resilient sealing material further adheres to the section of said flexible, translucent film layer.

* * * * *